United States Patent [19]
Vermeerbergen et al.

[11] 3,811,588
[45] May 21, 1974

[54] BOTTLE

[75] Inventors: Leon Roger Vermeerbergen, Ol Lagnieu; Guy Antoine Flamand, Chalon-sur-Saone, both of France

[73] Assignee: Saint-Gobain Industries, Neuilly sur Seine, France

[22] Filed: Apr. 6, 1972

[21] Appl. No.: 241,708

[30] Foreign Application Priority Data
Apr. 8, 1971 France .............................. 71.12439

[52] U.S. Cl. .............................................. 215/1 C
[51] Int. Cl. ............................................. B65d 1/02
[58] Field of Search .................................... 215/1 C

[56] References Cited
UNITED STATES PATENTS

| | | | |
|---|---|---|---|
| 3,643,829 | 2/1972 | Lachner | 215/1 C |
| 3,029,963 | 4/1962 | Evers | 215/1 C |
| 3,708,082 | 1/1973 | Platte | 215/1 C |
| 3,343,579 | 9/1967 | Clark | 215/1 C X |
| 3,720,339 | 3/1973 | Khetani | 215/1 C |

Primary Examiner—Donald F. Norton
Attorney, Agent, or Firm—Pennie & Edmonds

[57] ABSTRACT

A bottle of especial utility is disclosed. The bottle may be made of synthetic material as polyvinyl chloride. The bottle is formed by the rotation of a faired generating line made up from a straight linear segment and arcs of selected radii and centers about a central longitudinal axis. The linear segment of the generating line is parallel with the axis and the arcs are tangent at their points of juncture with each other and with the linear segment. The generating line thus rotated defines a form from which a mold is readily and inexpensively made to produce a bottle having adequate strength. The bottle may be used to contain, in particular, carbonated and like beverages or liquids. The bottom of the bottle is interiorly convex reentrant shape and has an exterior integral diametral reinforcing rib.

7 Claims, 2 Drawing Figures

PATENTED MAY 21 1974
3,811,588
FIG. 1
FIG. 2
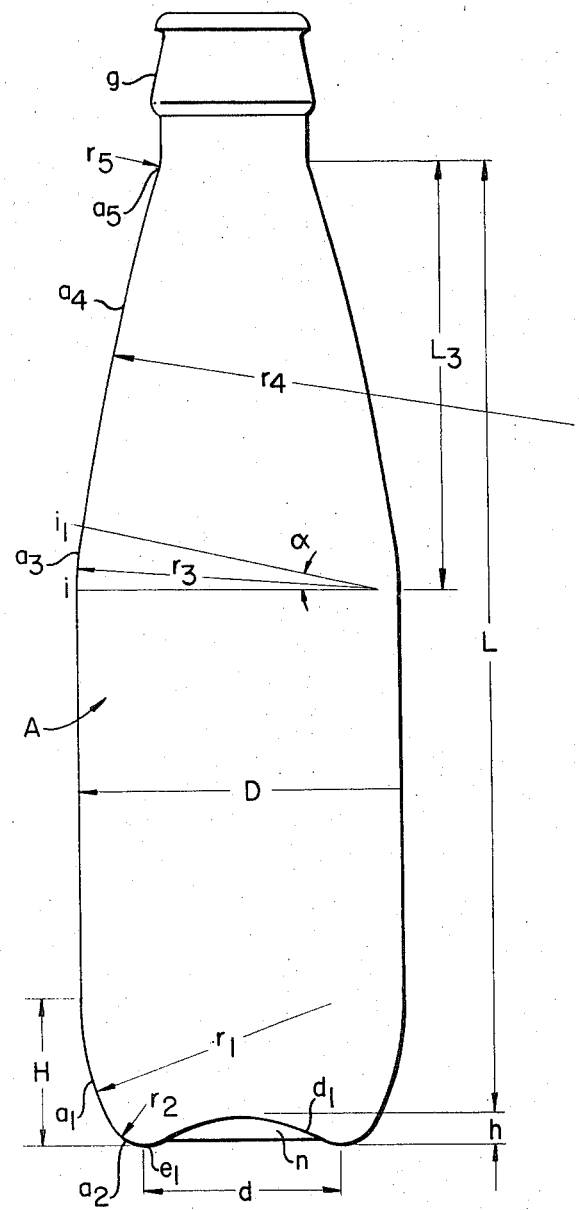
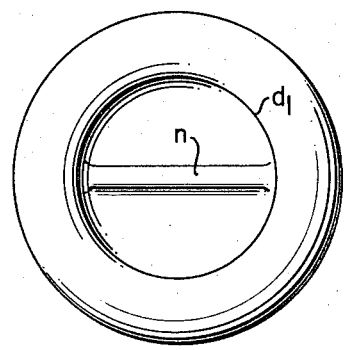

BOTTLE

BACKGROUND OF THE INVENTION

This invention relates to bottles. This invention relates in particular to bottles made of synthetic plastic material such as polyvinyl chloride. Bottles as disclosed herein are especially well adapted by reason of adequate strength to contain carbonated beverages and like liquids.

It is an object of the present invention to provide a bottle which has excellent mechanical strength at every point on its surface. It is a further object of the present invention to provide a bottle which can be economically fabricated in molds of simple and readily shaped form.

SUMMARY OF THE INVENTION

The bottle of the present invention is primarily characterized by side walls generated by the rotation of a faired line including a straight linear segment and arcs of circles of predetermined radii about a central longitudinal axis. The faired line is coplanar with and radially spaced from the longitudinal axis. The generating line provides no deviation, that is, the line throughout its length including the points of junction of the several arcuate and straight portions flows smoothly. Thereby the invention possesses the great advantages of ready fabrication of the molds in which the bottles are shaped.

More specifically, the invention has added utility ducts the fact that the portion of the bottle immediately below the finish, which may comprise a ring and a ball (or back ring), is generated by the rotation of the arc of a circle concave exteriorly of the finished bottle, that is, having its center external of the bottle on the corresponding side of the generating line and forming a part of the neck. This arc, generating the upper portion of the neck, follows smoothly into an arc of a circle convex exteriorly with respect to the exterior of the bottle. This arc will have its center on the other side of the generating line and forms the main part or base of the neck.

The shoulder is generated immediately below the base of the neck. The shoulder is generated by the rotation of a circular arc about the aforesaid axis. The arc has its radius centered interiorly of the wall on the aforesaid other side of the generating line. The radius of the arc is no greater than the arc generating or defining the base of the neck. The lower terminus of the arc follows smoothly and tangentially into the upper terminus of a straight linear segment whose rotation about the axis defines the body or cylindrical section of the bottle.

Immediately below the straight linear segment the generating line follows smoothly and tangentially into another arc whose surface of rotation defines the insweep portion of the bottle. The insweep portion is followed by an arc of different radius whose surface of rotation about the axis defines the heel of the bottle.

The base of the bottle is pushed up, that is, inwardly or interiorly convex. Thus, the surface of the base may be defined by the rotation of an arc which is centered on the axis below the base.

In one preferred form of the invention the two consecutive circular arcs defining the base portion of the neck and the shoulder, as previously described, may have equal radii.

Other features, characteristics and advantages of the invention will become apparent to those skilled in the art through a study of the following detailed but nonlimiting example and the accompanying drawing.

BRIEF DESCRIPTION OF THE DRAWING

FIG. 1 is a side elevation of a bottle formed in accordance with the invention, and FIG. 2 is a view looking upwardly along the axis of rotation of the generating line.

DESCRIPTION OF THE PREFERRED EMBODIMENT

Starting at the bottom the bottle A is formed with a pushed up or inwardly convex base $d_1$ defined by an arc of chordal dimension d having its center on the axis of rotation of the generating line or central axis of symmetry (hereinafter "axis"), below the bottle. The base thus formed has an axial dimension h. At a point $e_1$ the arc of base $d_1$ follows smoothly and tangentially into an arc $a_2$ of radius $r_2$ to form the heel. The center of arc $a_2$ is within the bottle and on the same side of the axis. This arc merges smoothly and tangentially into an arc $a_1$ of radius $r_1$. This arc extends to a height H above the heel. As shown, radius $r_1$ is relatively long in comparison with radius $r_2$. The center of the arc $a_1$ is within the bottle but on the side of the axis opposite to the generating arc.

The arc $a_1$ at the height H merges smoothly and tangentially into a straight linear segment of diameter D. The straight linear segment forms the body or cylindrical section of the bottle. This segment is, as shown, parallel with the axis.

The 3 segment at a point i merges smoothly and tangentially into an arc $a_3$ of radius $r_3$. This arc generates the shoulder. As shown, radius $r_3$ may be of a length approximately equal to the diameter D.

Arc $a_3$ extends through an angle $\alpha$. The arc $a_3$ at its upper terminus merges smoothly and tangentially at $i_1$ into an arc $a_4$ of radius $r_4$. The arc $a_4$ defines the base of the neck. Radius $r_4$ is relatively long. The center of arc $a_4$ is external of the bottle, on the side of the axis remote from the generating line. The center of the arc lies on or adjacent to a horizontal plane through the shoulder. Arc $a_4$ extends through a distance L3 measured parallel with the axis. The arc $a_4$ at its upper terminus merges smoothly and tangentially with arc $a_5$ defining the upper part of the neck. Arc $a_5$ has a radius $r_5$ which is equal to or less than radius $r_4$. The center of arc $a_5$ is external of the bottle and on the same side of the axis as the generating line. The arc $a_5$ at its upper terminus merges sm smoothly and tangentially into the ball or back ring which with its surmounting ring forms the finish or spout g.

Each of the arcs and straight linear segment merge smoothly and tengentially at their termini one another into so that the generating line formed to the left of the axis of symmetry between the finish and the bottom of the bottle is smooth, fair and devoid of abrupt changes in direction.

As shown in both Figures the base is provided with an integral diametrically extending reinforcing rib or vane n.

The following table gives the various characteristics and related dimensions of a bottle constructed in accordance with the invention.

TABLE I $r_1$ (constant) < D
$r_2$ (constant) < 0.15D
$r_3$ (constant)
$r_4$ (constant) > 2D
$r_5 \leq r_4$
$L_3 < 0.5 L$ The base is not necessarily a surface of revolution about the central axis, preferably containing a brace.

Table II gives two examples of actual dimensions which a bottle constructed in accordance with the invention may have, all dimensions being in mm.

TABLE II

|   | Example 1 | Example 2 |
|---|---|---|
| D | 57.2 | 59.2 |
| $r_1$ | 45 | 45 |
| $r_2$ | 6.5 | 7 |
| $r_3$ | 50 | 50 |
| $r_4$ | 390 | 200 |
| $r_5$ | 8 | 3 |
| d | 35 | 37 |
| H | 24.75 | 24.75 |
| h | 5 | 5 |
| L | 165 | 149 |
| $L_3$ | 74 | 57.5 |
| α | at least 4° | |

We claim:

1. A molded plastic bottle comprising a base, a finish and a smooth following connecting side wall including a surface of revolution presenting substantially a cylindrically shaped body portion and a portion connecting said body portion and said finish, the bottle being characterized by the fact that throughout said connecting portion the generatrix, beginning at said finish, includes:
   a. a first arc of a circle whose concavity is directed radially outwardly;
   b. a second arc of a circle whose concavity is directed radially inwardly, said first and second arcs defining a neck of said bottle, said second arc having a radius which is more than twice the diameter of said body portion; and,
   c. a third arc of a circle whose concavity is directed radially inwardly, the radius of third arc being no greater than the radius of said second arc.

2. The bottle of claim 1 wherein the radius of said first arc is small compared to the radius of said second arc.

3. The bottle of claim 1 further characterized by the fact that the length of the connecting portion is less than one-half the length between said finish and said base.

4. The bottle of claim 1 wherein the radius of said second arc is equal to the radius of said third arc.

5. The bottle of claim 1 wherein the radius of said second arc is greater than the radius of said third arc.

6. The bottle of claim 1 where said third arc extends through an angle of at least 4°.

7. The bottle of claim 1 wherein said plastic bottle is formed of polyvinyl chloride.

* * * * *

O-1050
(5/69)

UNITED STATES PATENT OFFICE
CERTIFICATE OF CORRECTION

Patent No. __3,811,588__   Dated __May 21, 1974__

Inventor(s) __Vermeerbergen et al.__

It is certified that error appears in the above-identified patent and that said Letters Patent are hereby corrected as shown below:

Column 1, line 32, for "ducts" substitute -- due to --.
Column 2, line 37, for "3" substitute -- straight --;
         line 49, for "L3" substitute -- $L_3$ --;
         line 60, insert --into-- after "termini";
         line 61, cancel "into".

Signed and sealed this 1st day of October 1974.

(SEAL)
Attest:

McCOY M. GIBSON JR.
Attesting Officer

C. MARSHALL DANN
Commissioner of Patents